United States Patent
Matsumoto

(10) Patent No.: US 12,459,409 B2
(45) Date of Patent: Nov. 4, 2025

(54) CLIP HOLDING UNIT, MOLDING MOLD AND METHOD FOR MANUFACTURING SEAT PAD

(71) Applicant: INOAC CORPORATION, Nagoya (JP)

(72) Inventor: Masato Matsumoto, Aichi (JP)

(73) Assignee: INOAC CORPORATION, Nagoya (JP)

( * ) Notice: Subject to any disclaimer, the term of this patent is extended or adjusted under 35 U.S.C. 154(b) by 513 days.

(21) Appl. No.: 17/423,899

(22) PCT Filed: Jan. 20, 2020

(86) PCT No.: PCT/JP2020/001640
§ 371 (c)(1),
(2) Date: Jul. 19, 2021

(87) PCT Pub. No.: WO2020/153282
PCT Pub. Date: Jul. 30, 2020

(65) Prior Publication Data
US 2022/0080866 A1 Mar. 17, 2022

(30) Foreign Application Priority Data
Jan. 22, 2019 (JP) ................................. 2019-008427

(51) Int. Cl.
*B60N 2/58* (2006.01)
*B29C 44/12* (2006.01)
*B29C 44/58* (2006.01)
*B29K 75/00* (2006.01)
(Continued)

(52) U.S. Cl.
CPC ............. *B60N 2/5891* (2013.01); *B29C 44/12* (2013.01); *B29C 44/58* (2013.01); *B60N 2/5825* (2013.01); *B68G 7/05* (2013.01); *B29K 2075/00* (2013.01); *B29L 2031/58* (2013.01)

(58) Field of Classification Search
CPC ....... B29C 44/12; B29C 44/58; B60N 2/5891; B60N 2/5825; B68G 7/05; B29K 2075/00; B29L 2031/58
See application file for complete search history.

(56) References Cited

U.S. PATENT DOCUMENTS
2015/0328808 A1    11/2015  Sasaki et al.

FOREIGN PATENT DOCUMENTS
CN   105082443 A   11/2015
JP   H06-254903 A   9/1994
JP   2008-168446 A   7/2008
(Continued)

*Primary Examiner* — Galen H Hauth
*Assistant Examiner* — Mohamed K Ahmed Ali
(74) *Attorney, Agent, or Firm* — SOLARIS Intellectual Property Group, PLLC

(57) ABSTRACT

There is provided a clip holding unit 50 to be used during a foam molding of a seat pad 20, and the seat pad 20 includes a clip 24 used for attaching a seat cover 18 to the seat pad 20. The clip holding unit 50 is provided in a lower mold 42 of a molding mold 40, and holds the clip 24 during the foam molding. The clip holding unit 50 includes a locking portion 54 to be sandwiched between a pair of locking pieces 30 of the clip 24; a base portion 55 extending from the lower mold 42 to the locking portion 54; and an eaves portion 56 projecting laterally from the base portion 55 as going upward from below.

7 Claims, 16 Drawing Sheets

(51) Int. Cl.
    *B29L 31/58*         (2006.01)
    *B68G 7/05*          (2006.01)

(56) References Cited

FOREIGN PATENT DOCUMENTS

| | | | |
|---|---|---|---|
| JP | 2015-217147 A | | 12/2015 |
| JP | 2017-60582 A | | 3/2017 |
| JP | 2018027176 A | * | 2/2018 |

* cited by examiner

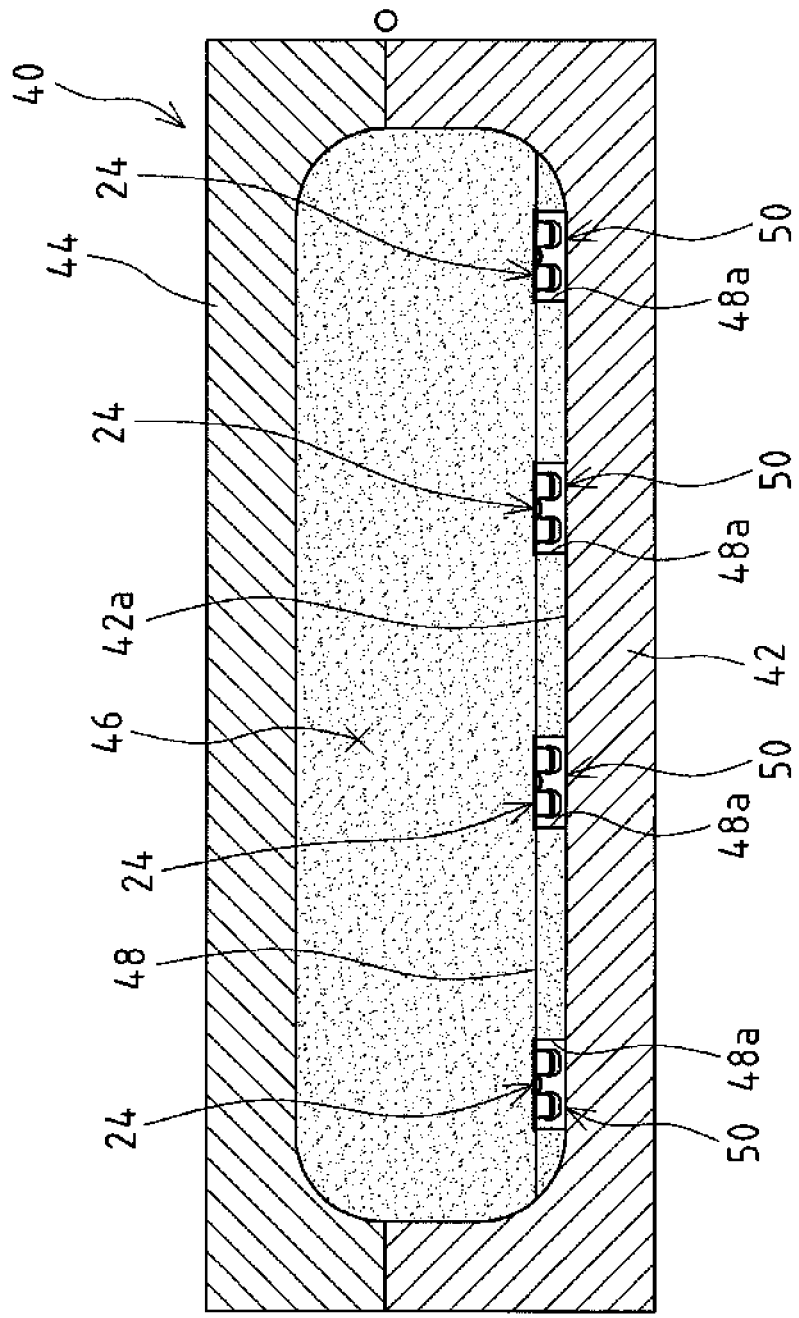

CLIP HOLDING UNIT, MOLDING MOLD AND METHOD FOR MANUFACTURING SEAT PAD

TECHNICAL FIELD

The present invention relates to a clip holding unit for holding a clip during molding of a seat pad, a molding mold including the clip holding unit, and a method for manufacturing a seat pad using the clip holding unit.

BACKGROUND ART

In a seat for vehicle, a seat cover is held by a clip provided at a bottom of a groove portion formed in one surface of a seat pad, and thus a part of the seat cover is drawn into the groove portion and the seat cover is attached in a stretched state (for example, with reference to Patent Literature 1). Such a clip has a pair of engaging claws disposed to face each other. An arrowhead-shaped attachment tool attached to the seat cover is fitted between the pair of engaging claws, and the seat cover is held on the seat pad.

The above-described seat pad is obtained by insert molding in which a foam raw material is foamed and cured in a state in which a clip is attached to a fixture provided in a molding mold and the clip is disposed at a position corresponding to a bottom of a groove portion of the seat pad, as in Patent Literature 1.

CITATION LIST

Patent Literature

Patent Literature 1: JP-A-2017-60582

SUMMARY OF INVENTION

Technical Problem

In Patent Literature 1, the foam raw material is prevented from entering between the pair of engaging claws by forming a wall surface in the fixture according to a shape of the engaging claws. However, when the wall surface of the fixture is formed with high accuracy according to the shape of the engaging claws, a large force is required during attachment of the clip to the fixture, and it is difficult to attach the clip to the fixture. Further, when the engagement force between the fixture and the clip is too strong, it may be difficult to detach the clip from the fixture when the seat pad is demolded, and the clip may fall off from the seat pad.

The present invention has been proposed in view of the above problems in the related-art techniques in order to suitably solve these problems. An object of the present invention is to provide a clip holding unit, a molding mold, and a method for manufacturing a seat pad, by which a clip can be easily attached and detached and a foam can be prevented from adhering to an unnecessary portion.

Solution to Problem

According to one aspect of the present invention, there is provided a clip holding unit to be used during a foam molding of a seat pad, the seat pad includes a clip used for attaching a seat cover to the seat pad, the clip holding unit is provided in a lower mold of a molding mold and holds the clip during the foam molding, and the clip holding unit includes: a locking portion to be sandwiched between a pair of locking pieces of the clip; a base portion extending from the lower mold to the locking portion; and an eaves portion projecting laterally from the base portion as going upward from below.

In the above clip holding unit, the locking portion may include: a recessed portion that is capable of receiving the locking piece and is recessed laterally; and a retaining portion that retains the locking piece and bulges laterally, and the eaves portion may be provided so as to cross, in a left-right direction, a virtual region through which the recessed portion passes when the recessed portion is virtually moved downward, when viewed from a direction in which the eaves portion projects.

In the above clip holding unit, when viewed from the direction in which the eaves portion projects, both end portions of the eaves portion that cross the eaves portion in the left-right direction may extend upward while being curved along an edge of the recessed portion.

In the above clip holding unit, the eaves portion may project laterally from an intermediate position between a lower end and an upper end of the base portion.

According to an aspect of the present invention, there is provided a molding mold for a seat pad, provided with the above clip holding unit, the clip is provided in a groove portion provided in a surface of the seat pad, the lower mold is provided with a groove forming portion for forming the groove portion, and the groove forming portion is provided with an installation recess portion to which the clip holding unit is to be attached.

According to one aspect of the present invention, there is provided a method for manufacturing a seat pad including a clip used for attaching a seat cover, a molding mold includes a lower mold provided with a clip holding unit that holds the clip, and an upper mold, and the method includes: setting the clip in the clip holding unit; supplying a foam raw material to the molding mold; and foaming the foam raw material to mold the seat pad while guiding, by the clip holding unit, the foam raw material rising upward from below by foaming, in a direction away from an assembly portion of the clip holding unit and the clip.

In the above method for manufacturing a seat pad, the clip holding unit may have a locking portion to be sandwiched between a pair of locking pieces of the clip, and a base portion extending from the lower mold to the locking portion, the base portion may be provided with an eaves portion that projects laterally as going upward from below, and the eaves portion may guide the foam raw material in the direction away from the assembly portion of the clip holding unit and the clip.

In the above method for manufacturing a seat pad, the eaves portion may project laterally from an intermediate position between a lower end and an upper end of the base portion.

Advantageous Effects of Invention

According to the clip holding unit and the molding mold of the present invention, the clip can be easily attached and detached, and the foam can be prevented from adhering to an unnecessary portion.

According to the method for manufacturing a seat pad of the present invention, the clip can be easily attached and detached, and the foam can be prevented from adhering to an unnecessary portion.

BRIEF DESCRIPTION OF DRAWINGS

FIG. 10B is a diagram illustrating a manufacturing process of the seat pad of the embodiment, and shows a state after a foam raw material is injected.

FIG. 11A shows a cross section at a position corresponding to a line A-A in FIG. 9B.

FIG. 11B is taken at a position corresponding to the line A-A in FIG. 9B.

DESCRIPTION OF EMBODIMENTS

Next, A clip holding unit and a method for manufacturing a seat pad according to the present invention will be described below with reference to the accompanying drawings while showing preferred embodiments. In the embodiments, a seat pad 20 to be used in a seat 10 installed in a passenger compartment of a passenger vehicle will be described.

Embodiment

Figure 1:
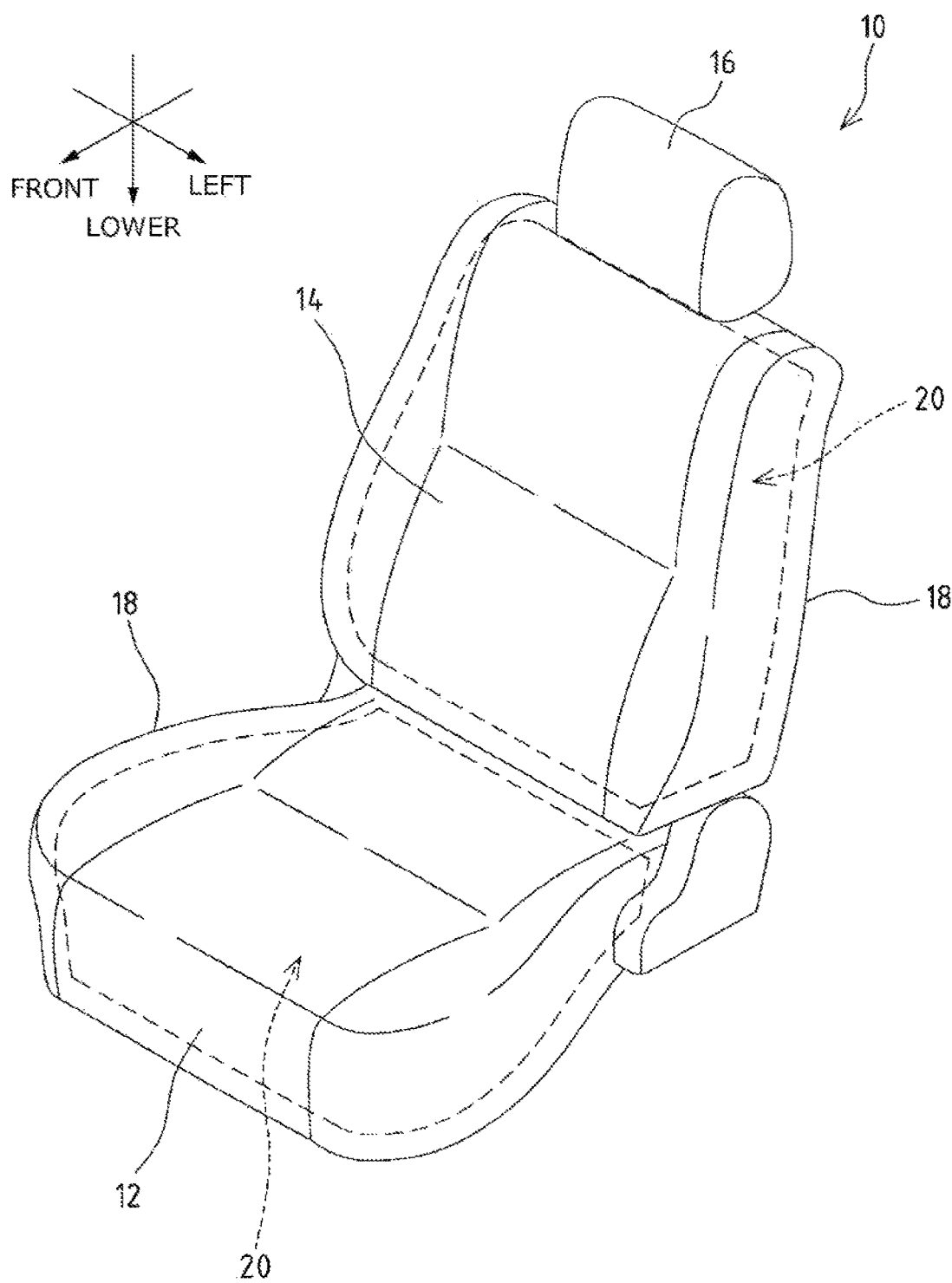
FIG. 1 is a perspective view showing a seat in which a seat pad according to an embodiment of the present invention is used.

FIG. 1 is a perspective view showing the seat 10 in which the seat pad 20 according to an embodiment of the present invention is used. As shown in FIG. 1, the vehicle seat 10 includes a seat portion 12 that supports a lower body of an occupant, a backrest portion 14 that is tiltably installed at a rear portion of the seat portion 12 and supports an upper body of the occupant, and a headrest 16 that is installed at an upper portion of the backrest portion 14 and supports a head of the occupant. The seat portion 12 and the backrest portion 14 are mainly formed of flexible polyurethane foam (foam). The seat portion 12 and the backrest portion 14 each include a seat pad 20 having a cushioning property, and a seat cover 18 made of cloth, synthetic leather, genuine leather, or the like, which is stretched so as to cover the entire seat pad 20. Since the seat portion 12 and the backrest portion 14 have similar basic structures and the manufacturing methods are also similar, the seat pad 20 forming the seat portion 12 will be described below. In the following description of the seat pad 20, upper, lower, front, rear, left, and right directions are defined based on an installation state in the vehicle. In the seat pad 20 configuring the seat portion 12, a support surface side of a seated occupant is an upper side, and a vehicle body side is a lower side.

Figure 2:
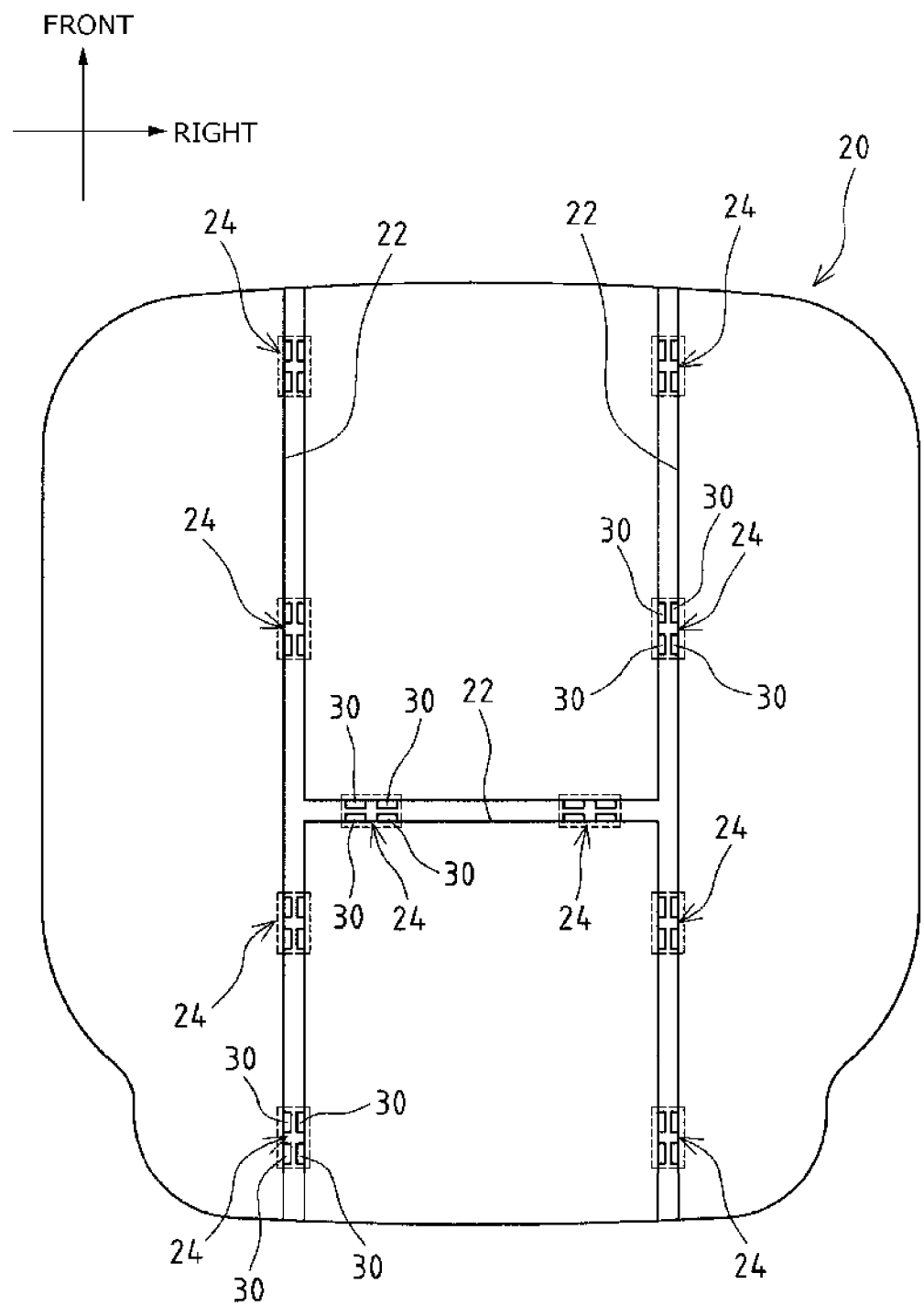
FIG. 2 is a plan view showing the seat pad of the embodiment. The view is shown from one surface side of the seat pad.

FIG. 2 is a plan view showing the seat pad 20. FIG. 2 shows an upper surface of the seat pad 20. As shown in FIG. 2, the seat pad 20 is provided with a plurality of groove portions 22 that are opened on the upper surface serving as an occupant side. In the seat pad 20 of the embodiment, two groove portions 22, 22 extending in a front-rear direction, and a groove 22 extending in a left-right direction between the two grooves 22, 22 extending in the front-rear direction, are formed.

Figure 3:
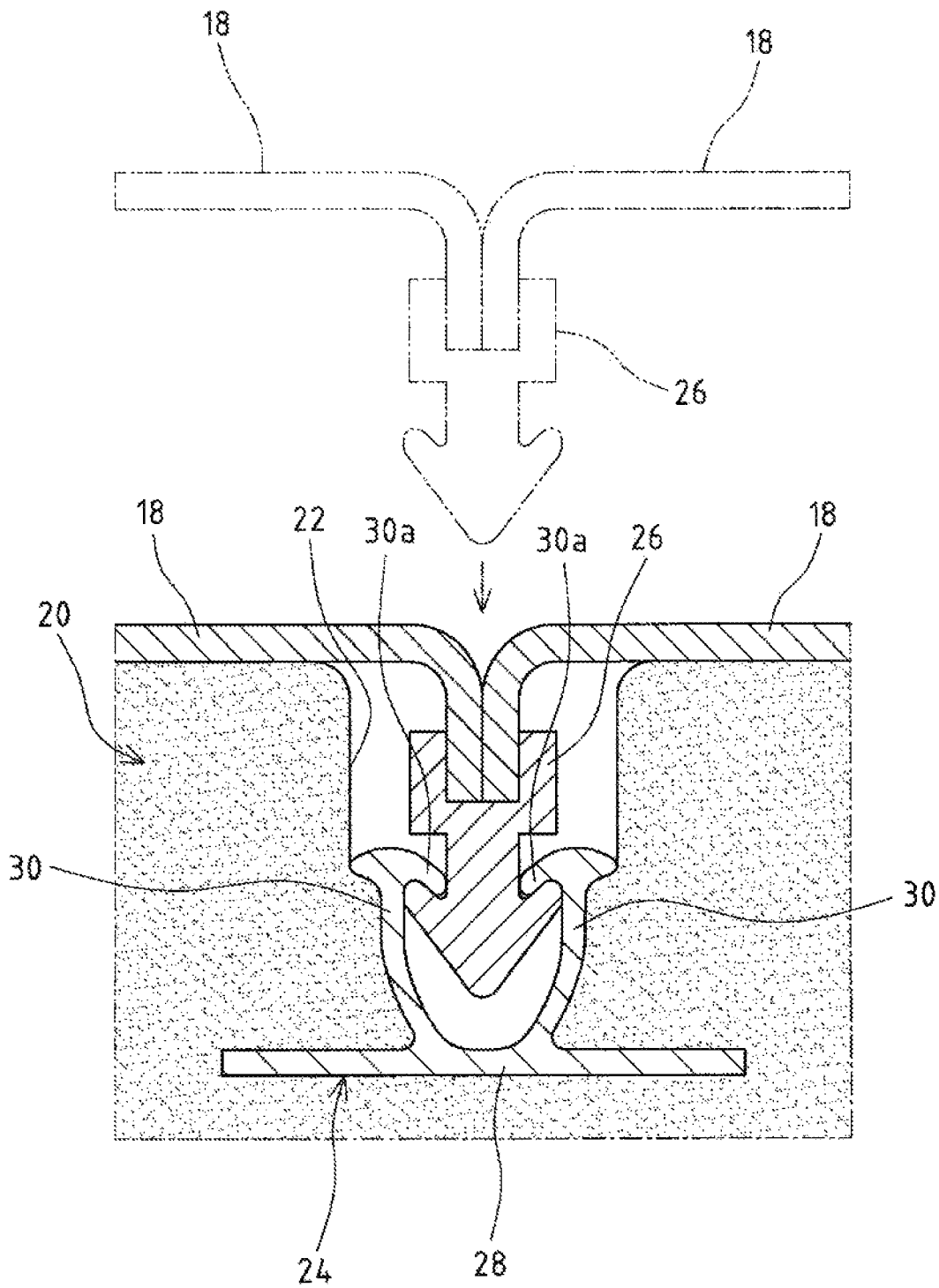
FIG. 3 is a cross-sectional view illustrating attachment of a seat cover to a clip in the seat pad according to the embodiment.

FIG. 3 is a cross-sectional view illustrating attachment of the seat cover 18 to the seat pad 20. As shown in FIGS. 2 and 3, in the seat pad 20, locking pieces 30 of a clip 24 are installed at a bottom of the groove portion 22 in a state of protruding upward. In a state in which an arrowhead-shaped attachment tool 26 attached to the seat cover 18 is held by the clip 24, the seat cover 18 is drawn into an inside of the groove portion 22, whereby the seat cover 18 is attached to the seat pad 20 in a state in which there is no wrinkle (a state in which tension is applied).

Figure 4:
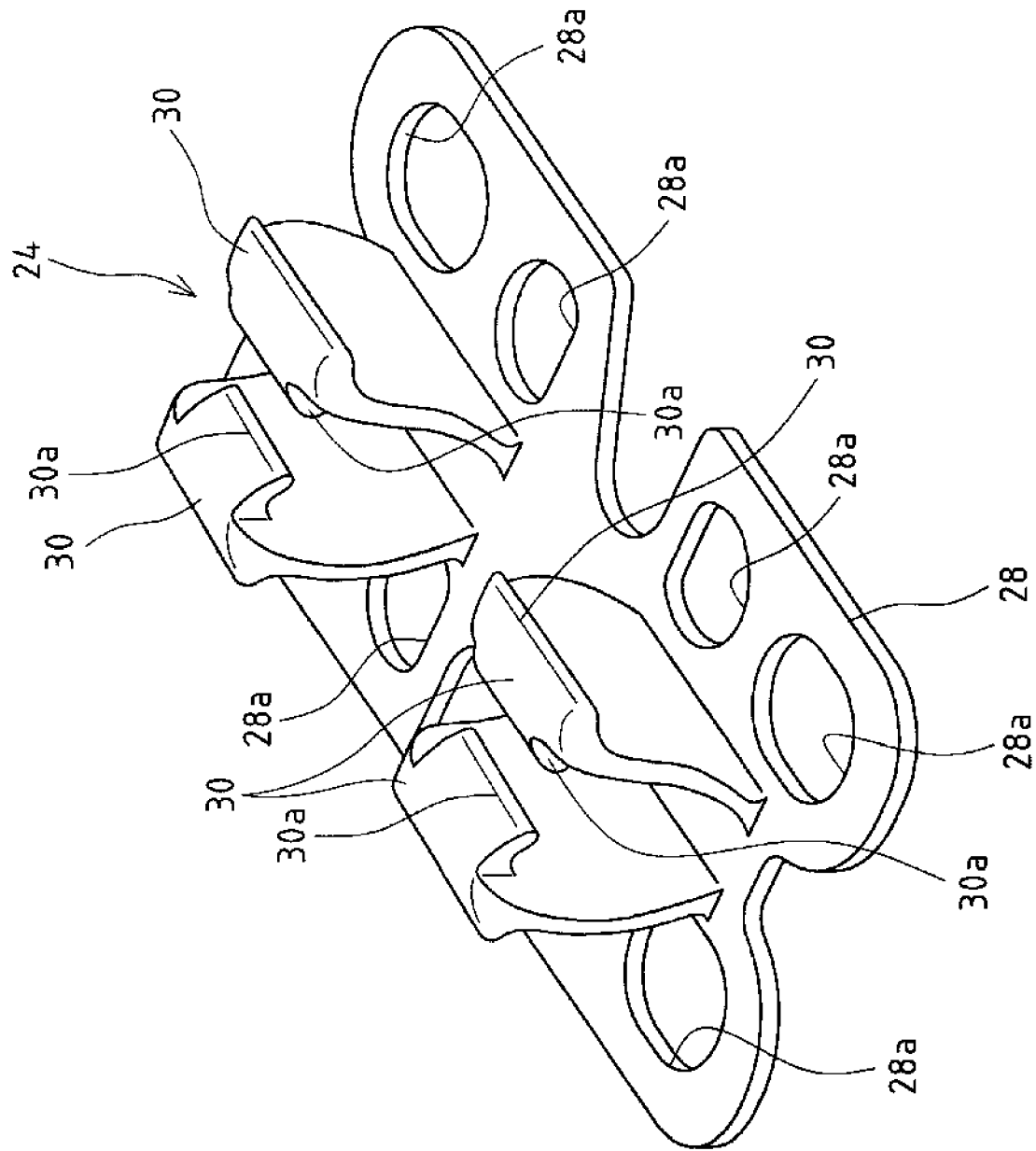
FIG. 4 is a perspective view showing the clip of the embodiment.

FIG. 4 is a perspective view showing the clip 24. As shown in FIG. 4, the clip 24 includes a plate-shaped base portion 28 that is to be embedded in a foam configuring the seat pad 20, and two pairs of locking pieces 30 that are provided so as to extend upward from the base portion 28 (one surface side of the seat pad 20). The two pairs of locking pieces 30, 30 are spaced apart from each other in the direction in which the groove portion 22 extends. The locking pieces 30 in one pair face each other in a width direction of the groove portion 22.

The locking piece 30 has, at a front end thereof, a claw portion 30a formed so as to protrude toward the mating locking piece 30. The base portion 28 has through holes 28a each being at a portion outward than a portion where the locking piece 30 protrudes from the base portion 28. The through holes 28a allow flow of a foam raw material H (FIG. 11B) during molding of the seat pad 20 to be described later. The clip 24 of the present example is a molded article of a synthetic resin in which the base portion 28 and the locking pieces 30 are integrally molded.

In the following description, a direction in which groove walls of the groove portion 22 face each other is referred to as a width direction, and a direction in which the groove portion 22 extends is referred to as a lateral direction. Further, a depth direction of the groove portion 22 is referred to as an upper-lower direction.

Figure 10A:
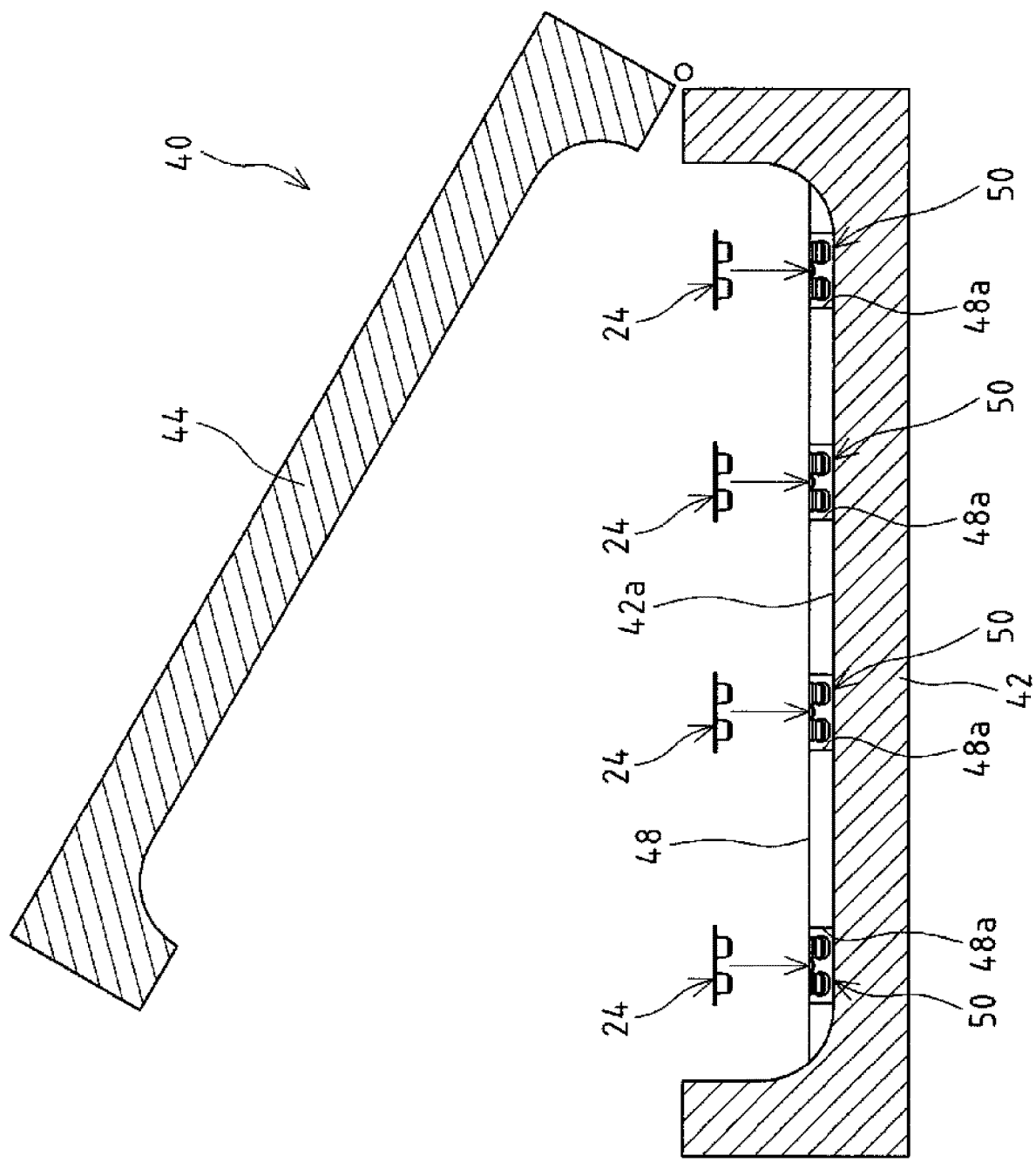
FIG. 10A is a diagram illustrating a manufacturing process of the seat pad of the embodiment, and shows a state in which the clip holders are attached to the lower mold.

Next, a molding mold 40 for molding the seat pad 20 will be described. FIGS. 10A and 10B are diagrams illustrating a manufacturing process of the seat pad 20. As shown in FIG. 10A, the molding mold 40 includes a lower mold 42 and an upper mold 44 disposed above the lower mold 42 when the mold is closed. By rotating the upper mold 44, the molding mold 40 is changeable between a mold closed state (with reference to FIG. 10B) in which a cavity 46 is formed between the lower mold 42 and the upper mold 44 and a mold open state (with reference to FIG. 10A) in which an interior of the molding mold 40 can be accessed. The molding mold 40 is configured to mold the seat pad 20 upside down in the cavity 46. That is, the molding mold 40 is configured to mold the seat pad 20 in a posture in which the clip 24 is positioned downward. An upper surface and a side surface of the seat pad 20 are mainly molded by the lower mold 42, and a lower surface of the seat pad 20 is mainly molded by the upper mold 44.

Figure 5:
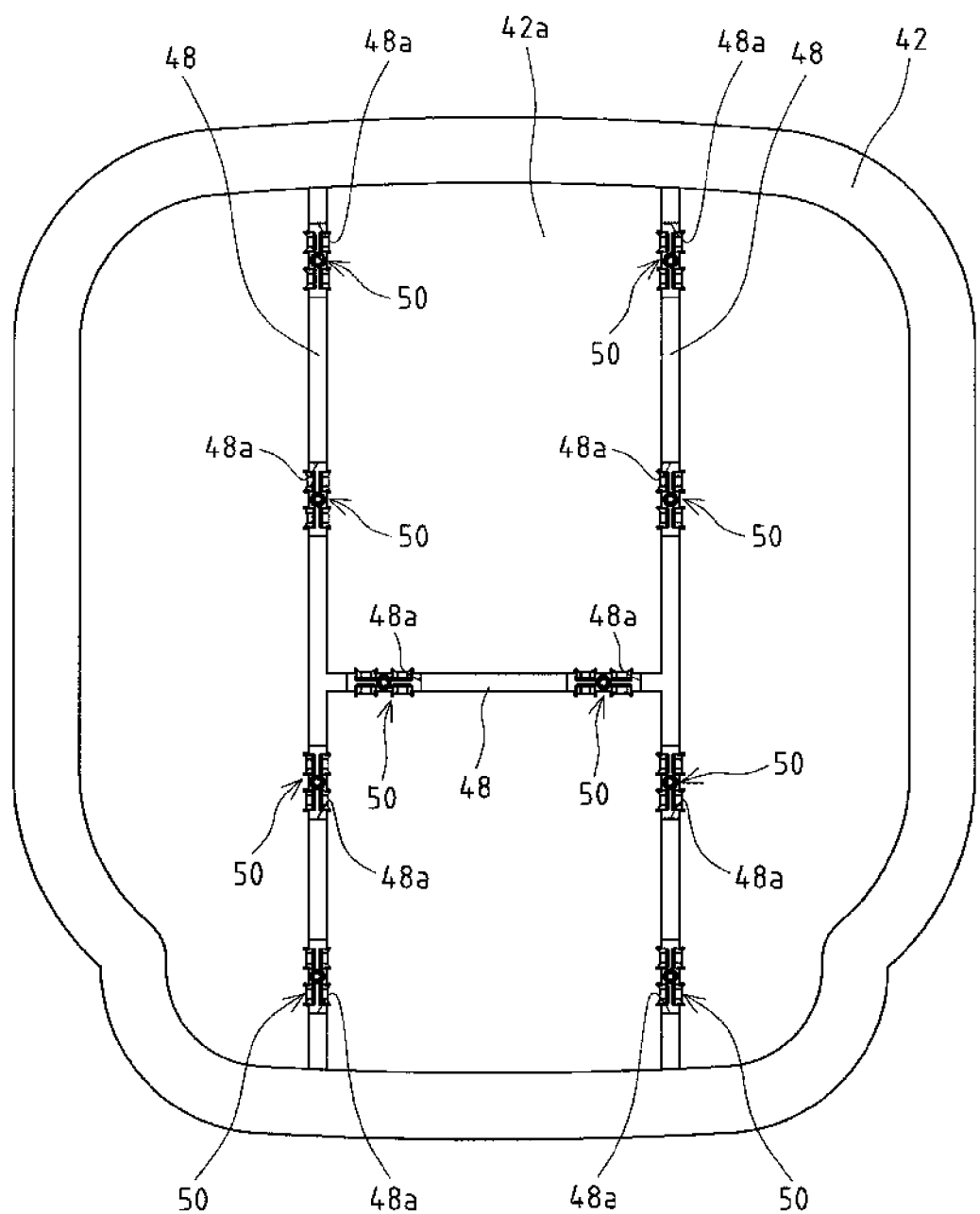
FIG. 5 is a plan view showing a lower mold of a molding mold according to an embodiment.

FIG. 5 is a plan view showing the lower mold 42 of the molding mold 40. As shown in FIG. 5, the lower mold 42 includes projection mold portions 48 that protrude upward from a lower mold surface (mold surface) 42a that defines the upper surface of the seat pad 20. The projection mold portions 48 define the groove portions 22 of the seat pad 20.

Figure 7:
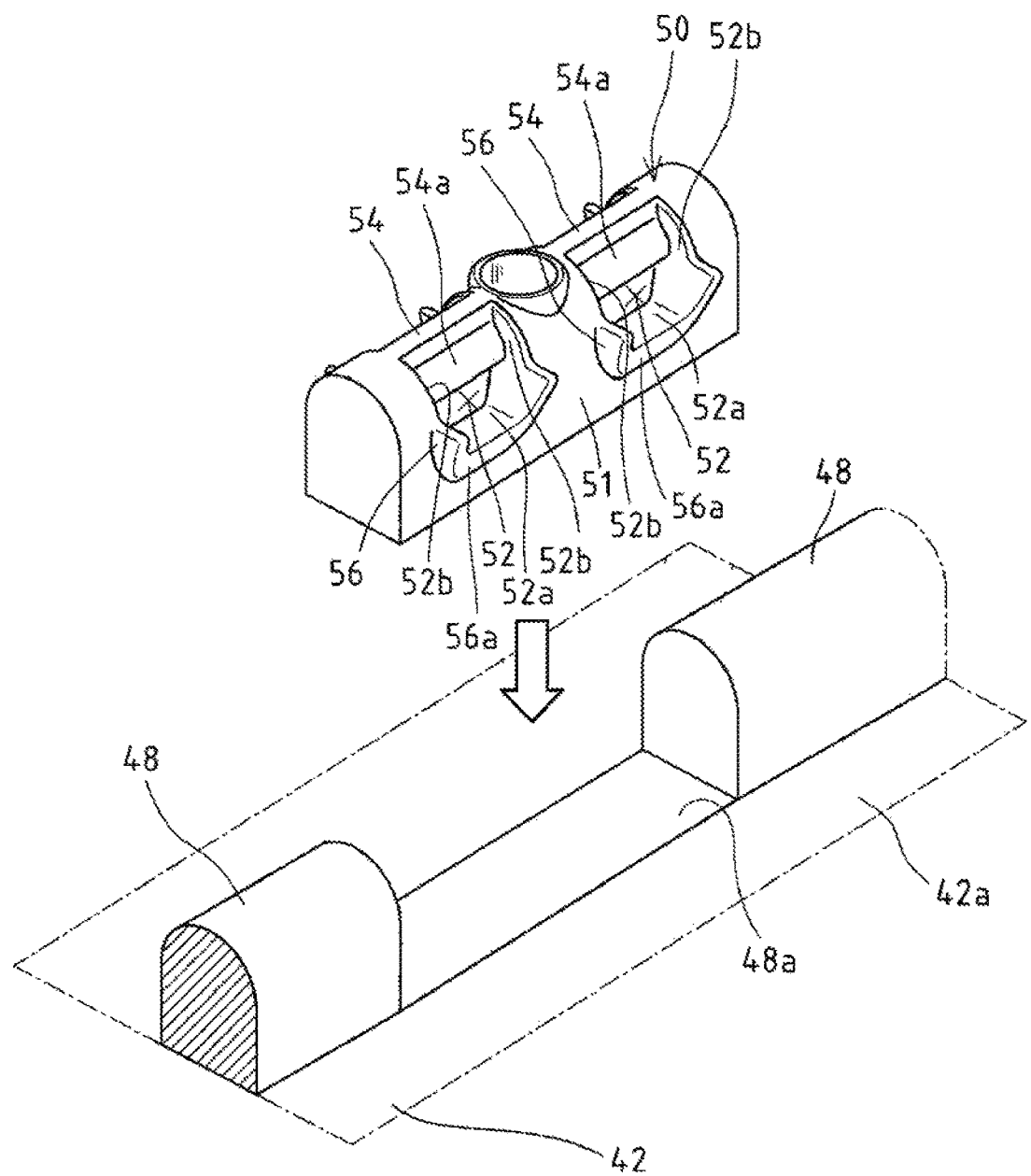
FIG. 7 is a perspective view showing a state in which the clip holder of the embodiment is to be installed on the lower mold.

FIG. 7 is a perspective view showing a state in which a clip holder 50 is to be installed on the lower mold 42. As shown in FIG. 7, the lower mold 42 is provided with projection mold portions (groove forming portions) 48 by which the groove portions 22 are formed. The projection mold portion 48 is provided with an installation recess portion 48a to which the clip holder (clip holding unit) 50 is to be attached. The clip holder 50 of the present example is detachably attached to the lower mold 42 by screwing. The lower mold 42 molds the groove portions 22 by the projection mold portions 48 and the clip holders 50.

Figure 6:
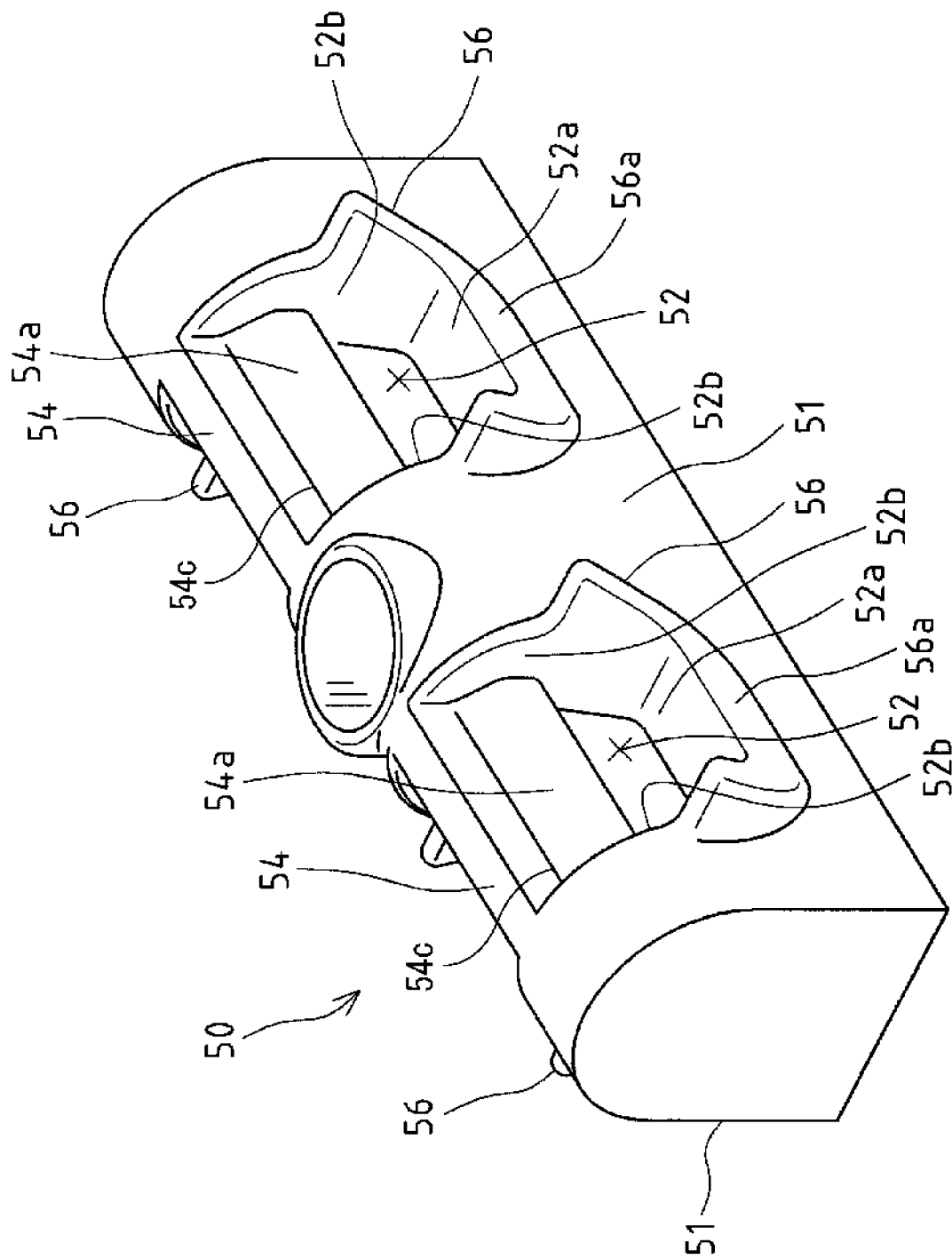
FIG. 6 is a perspective view showing a clip holder of the embodiment.
Figure 8:
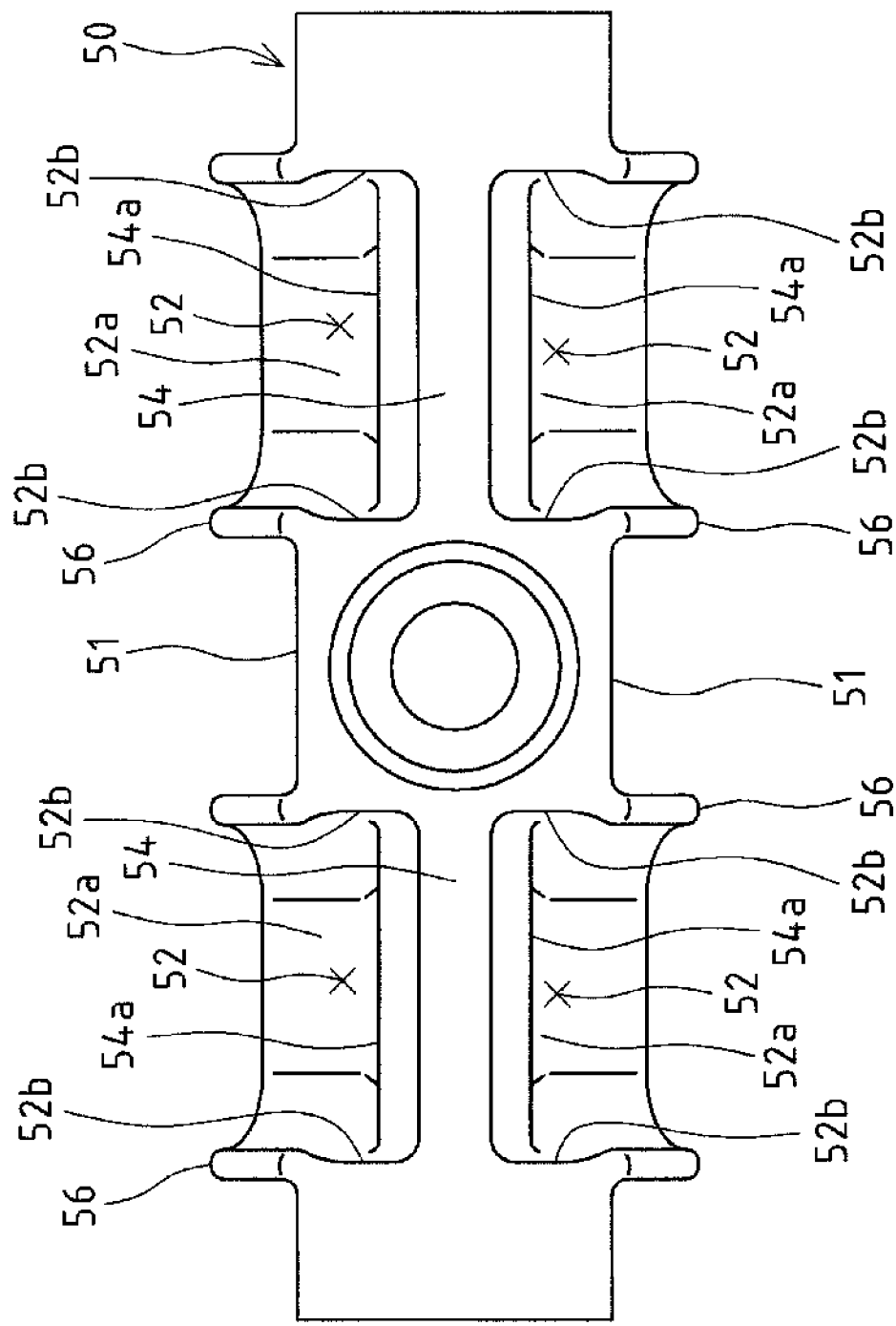
FIG. 8 is a plan view showing the clip holder of the embodiment.
Figure 9A:
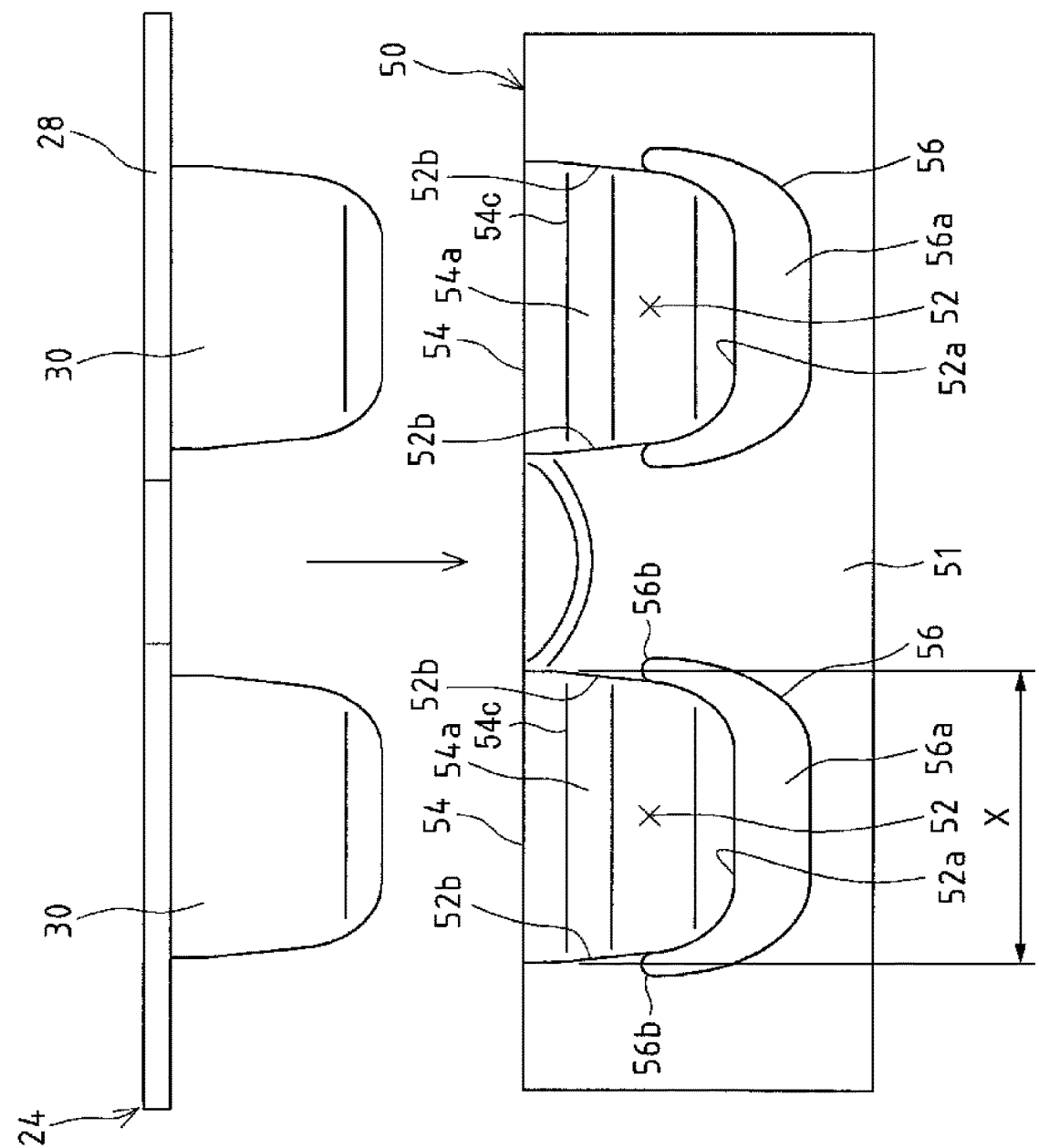
FIG. 9A is a front view of the clip holder of the embodiment, and shows a state before the clip is attached.
Figure 9B:
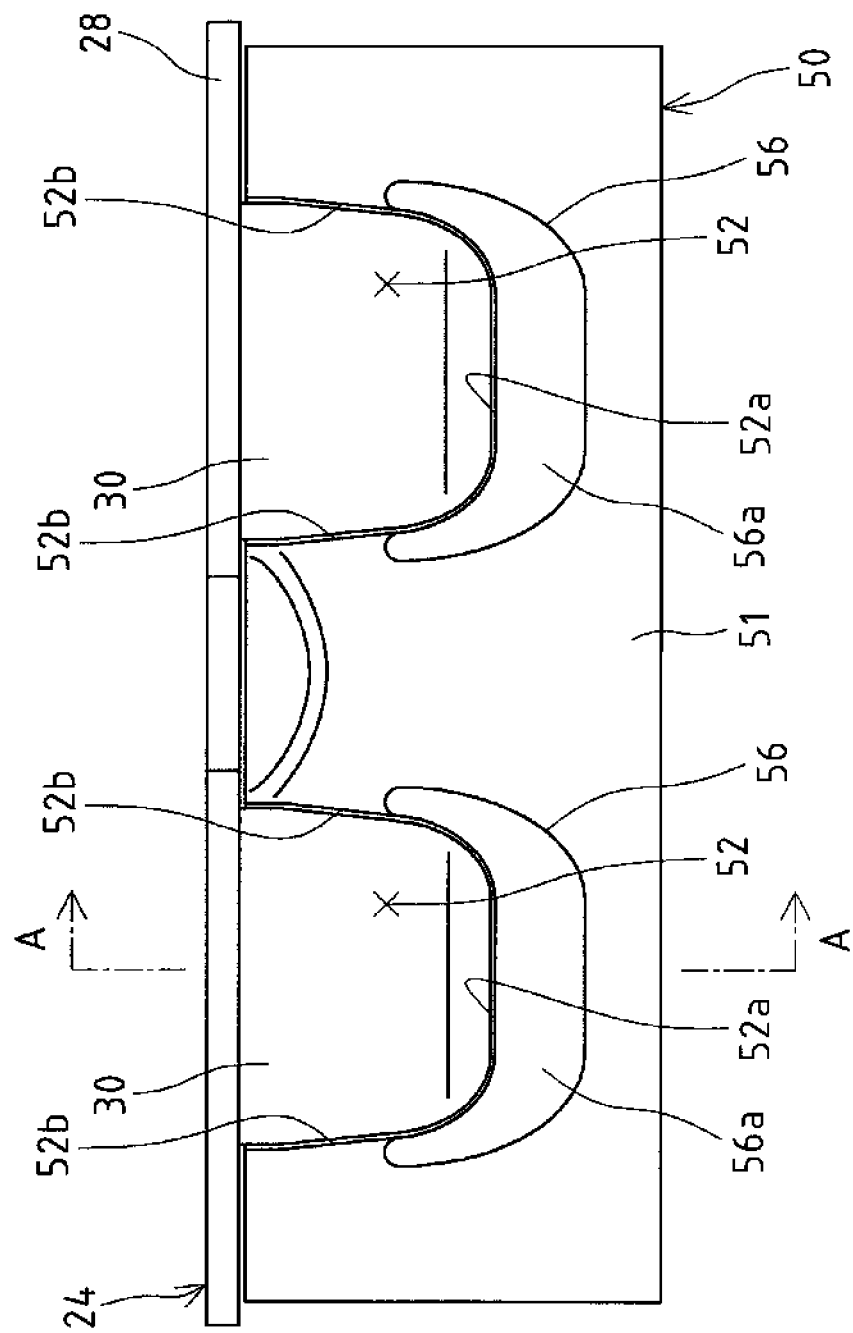
FIG. 9B is a front view of the clip holder of the embodiment, and shows a state after the clip is attached.

FIG. 6 is a perspective view showing the clip holder 50. FIG. 8 is a plan view showing the clip holder 50. FIGS. 9A and 9B are front views showing the clip holder 50. FIG. 9A shows a state before the clip is attached. FIG. 9B shows a state after the clip is attached. As shown in FIGS. 6, 8, 9A, and 9B, the clip holder 50 has a block shape made of metal such as stainless steel and formed according to the shape of the groove portion 22. The clip holder 50 includes side wall surfaces 51 extending in the upper-lower direction and the lateral direction. The groove wall of the groove portion 22 is molded by the side wall surfaces 51 during forming of the seat pad 20 (with reference to FIG. 7).

The clip holder 50 includes recessed portions 52 and locking portions 54. The recessed portion 52 is formed by the side wall surface 51 recessing inward. The recessed portion 52 is a portion capable of receiving the locking piece 30 of the clip 24. The locking portion 54 is provided inside the recessed portion 52. The locking portion 54 prevents the locking piece 30 received in the recessed portion 52 from coming off.

More specifically, the clip holder 50 has a pair of recessed portions 52, 52 which are formed by recessing both side wall surfaces 51, 51 extending in the upper-lower direction and the lateral direction, and which are configured to receive a pair of locking pieces 30, 30. Further, the clip holder 50 includes the locking portion 54 which is provided between a pair of recessed portions 52, 52 and into which the pair of locking pieces 30, 30 are fitted (with reference to FIG. 11A).

Further, the clip holder 50 has eaves portions 56. The eaves portion 56 is provided on the side wall surface 51. The eaves portion 56 projects from the side wall surface 51 as going toward a lower edge 52a of the recessed portion 52 from a lower side of the clip holder 50. The clip holder 50 of the present example includes two sets each including the locking portion 54 and a pair of recessed portions 52, 52, corresponding to the two pairs of locking pieces 30, 30.

As shown in FIGS. 6, 9A, and 9B, the recessed portion 52 is provided in a region cross an intermediate position from an upper end to a lower side of the side wall surface 51. The recessed portion 52 has a shape corresponding to an outer shape of the locking piece 30. The lower edge 52a of the recessed portion 52 projecting outward in the width direction further than the locking portion 54 faces the front end of the locking piece 30 received in the recessed portion 52. A side edge 52b of the recessed portion 52 projecting outward in the width direction further than the locking portion 54 faces a side edge of the locking piece 30 received in the recessed portion 52 (with reference to FIG. 9B). In the clip holder 50, a pair of recessed portions 52, 52 are disposed in a symmetrical positional relationship with the locking portion 54 interposed therebetween. The side edge 52b refers to an edge of the recessed portion 52 seen when the clip holder 50 is viewed from the direction shown in FIG. 9A.

As shown in FIG. 6, the locking portion 54 includes a retaining portion 54a formed at an intermediate portion in the upper-lower direction so as to project outward in the width direction from the upper end toward the lower side. The retaining portions 54a are provided on both sides of the locking portion 54 in the width direction. When a pair of locking pieces 30, 30 are fitted to the locking portion 54, the clip 24 is held by the locking portion 54 due to the engaging between the retaining portions 54a and the claw portions 30a of the locking pieces 30. When the pair of locking pieces 30, 30 are fitted to the locking portion 54, the base portion 28 is placed on an upper end of the clip holder 50, and thus the clip 24 is supported by the clip holder 50 (with reference to FIG. 11B). At this time, since each locking piece 30 is covered with the lower edge 52a and both side edges 52b, 52b of the recessed portion 52 of the clip holder 50, the foam raw material H is prevented from entering between the locking piece 30 and the locking portion 54 (with reference to FIG. 9B).

Figure 11A:
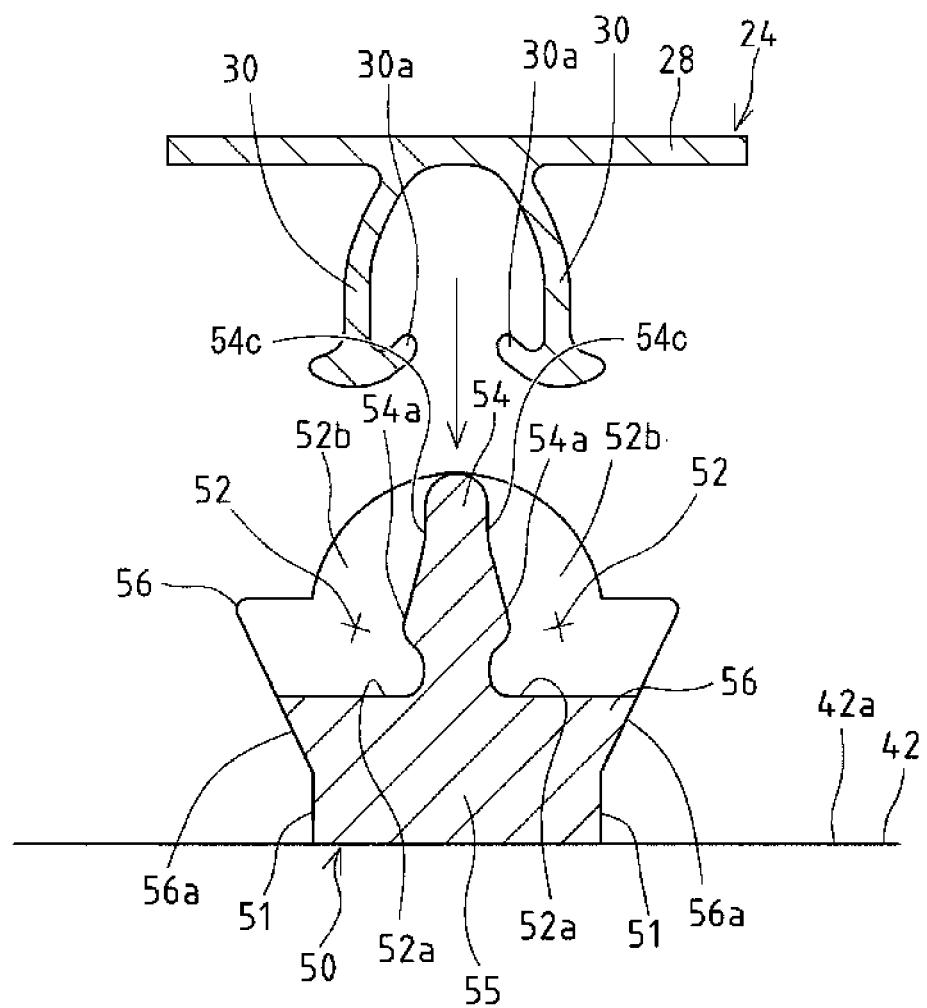
FIG. 11A shows a state immediately before the clip is attached to the clip holder.
Figure 11B:
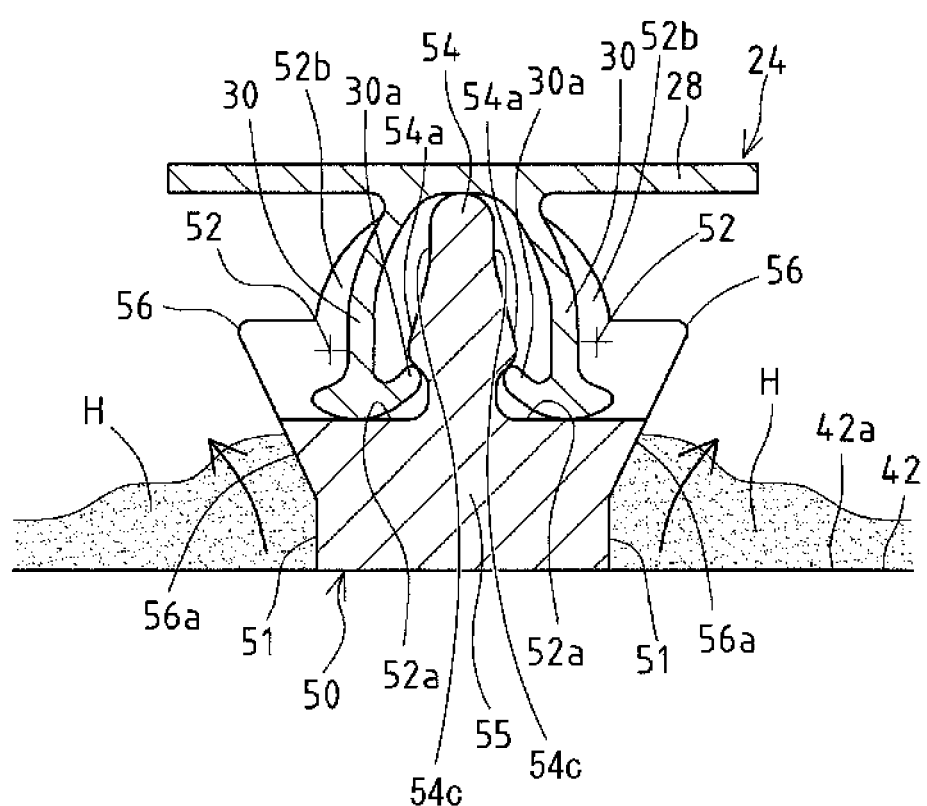
FIG. 11B shows a state in which the clip is attached to the clip holder.

FIGS. 11A and 11B are views illustrating an operation of the clip holder 50 in the manufacturing process of the seat pad 20. A cross section cut at a position corresponding to a line A-A in FIG. 9B is shown. As shown in FIG. 11A, the clip holder 50 includes the locking portion 54 that is to be sandwiched between a pair of locking pieces 30 of the clip 24, a base portion 55 that extends from the lower mold 42 to the locking portion 54, and the eaves portion 56 that projects laterally from the base portion 55 as going upward from below. That is, the eaves portion 56 that projects laterally from the base portion 55 is provided between the locking portion 54 and the lower mold 42.

Next, a method for manufacturing the seat pad 20 by the molding mold 40 provided with the above-described clip holder 50 will be described. First, the clip 24 is attached to the clip holder 50 installed on the lower mold 42 (with reference to FIGS. 10A and 11A). Specifically, a pair of locking pieces 30, 30 of the clip 24 are fitted to the locking portion 54. Accordingly, the clip 24 is held by the clip holder 50 in a state in which the locking pieces 30 are accommodated in the corresponding recessed portions 52 and the base portion 28 is placed on the upper side of the clip holder 50. In this state, the foam raw material H is supplied to the lower mold surface 42a of the lower mold 42, the molding mold 40 is closed, and the foam raw material H is foamed and cured in the cavity 46 so as to mold the seat pad 20 (with reference to FIG. 10B).

As shown in FIG. 11B, the foam raw material H supplied to the lower mold 42 rises upward from the lower mold 42 as the foam raw material H is foamed. While the foam raw material H rising upward from below is guided by the clip holder 50 in a direction away from an assembly portion of the clip holder 50 and the clip 24, the foam raw material H is foamed to mold the seat pad 20.

Specifically, when the foam material H rises upward from below, the foam raw material H is guided by an inclined surface 56a of the eaves portion 56 and is away from the assembly portion of the clip holder 50 and the clip 24. Therefore, the foam raw material H does not directly flow into the recessed portion 52, but flows into the recessed portion 52 through a path that is a detour by the eaves portion 56.

In this way, the eaves portion 56 of the clip holder 50 can delay the timing at which the foam raw material H reaches the recessed portion 52. Accordingly, as compared with the foam raw material H that directly flows into the recessed portion 52 when the eaves portion 56 is not provided, the foam raw material H arrives at the recessed portion 52 in a state in which the foaming and curing progresses and viscosity increases. The foam raw material H, where the foaming and curing progresses and viscosity is high, is less likely to enter into small gaps. As a result, it is difficult for the foam raw material H to enter an inside of the locking piece 30 from a gap between the recessed portion 52 and the locking piece 30, and the foam can be prevented from adhering to the inside (unnecessary portion) of the locking piece 30. Here, the inside of the locking piece 30 is a side of the locking piece 30 which faces the locking portion 54, and is a side where the locking piece 30 faces and engages with the attachment tool 26 during attachment of the attachment tool 26 of the seat cover 18.

The retaining portion 54a of the clip holder 50 and the claw portion 30a of the locking piece 30 of the clip 24 are preferably engaged with each other with an engagement force as small as possible. This makes it possible to attach and detach the clip 24 to and from the clip holder 50 with a small force. Since the clip 24 can be set with a small force to the clip holder 50 of the present example, workability is improved. Further, when the seat pad 20 integrated with the clip 24 is demolded from the molding mold 40 after being molded, the clip 24 can be removed from the clip holder 50 with a small force, so that it is possible to prevent the seat pad 20 from being damaged or the clip 24 from remaining in the lower mold 42 caused by the clip 24 not being removed from the clip holder 50.

Here, when the engagement force between the clip holder 50 and the clip 24 is small, a gap is likely to be formed between the clip holder 50 and the clip 24. In this case, during foam molding of the seat pad 20, the foam raw material H enters the gap, and the foam adheres to the claw portion 30a of the locking piece 30. When the foam adheres to the claw portion 30a, the engagement force between the clip 24 and the attachment tool 26 of the seat cover 18 is reduced. Therefore, in order to secure the engagement force between the clip 24 and the attachment tool 26, a repair work of removing the foam by post-processing is required.

Meanwhile, when dimensions of the clip holder 50 and the clip 24 are set such that a gap is not formed between the clip holder 50 and the clip 24, in a case where a dimensional error occurs in the clip 24, a large force is required when the clip 24 is set to the clip holder 50, and workability is deteriorated. In particular, when the clip 24 made of resin is employed, a dimensional error is likely to occur, and workability is likely to deteriorate. Further, when the seat pad 20 integrated with the clip 24 is demolded from the molding mold 40 after being molded, defects such as breakage of the seat pad 20 or the clip 24 remaining in the lower mold 42 caused by the clip 24 not being removed from the clip holder 50 are likely to occur.

However, according to the method for manufacturing the seat pad 20 according to the present embodiment, as described above, the timing at which the foam raw material H reaches the gap with the claw portion 30a of the locking piece 30 of the clip 24 is delayed by the eaves portion 56 of the clip holder 50. Therefore, even when the engagement force between the clip holder 50 and the clip 24 is set to be small and there is a gap between the clip holder 50 and the clip 24, the foam can be prevented from adhering to the inside of the locking piece 30. Accordingly, the time and effort of the repair work of removing the foam adhering to the inside of the locking piece 30 can be reduced. Further, since the foam does not adhere to the inside of the locking piece 30, it is easy to maintain the engagement force between the clip 24 and the attachment tool 26 that draws in the seat cover 18, and the seat cover 18 can be appropriately held on the seat pad 20 even when the clip holder 50 is repeatedly used.

Further, according to the method for manufacturing the seat pad 20 according to the present embodiment, although a detailed mechanism is unknown, voids (hollowed cavity portions) are less likely to occur around the clip 24. Therefore, the seat pad 20 can be stably manufactured with a low defective rate.

In the present embodiment, the locking portion 54 has the recessed portion 52 that can receive the locking piece 30 and is recessed laterally, and the retaining portion 54a that retains the locking piece 30 and bulges laterally. FIGS. 9A and 9B are views of the clip holder 50 as viewed from a direction in which the eaves portion 56 projects. In FIG. 9A, the eaves portion 56 is provided so as to cross, in the left-right direction, a virtual region X through which the recessed portion 52 passes when the recessed portion 52 is virtually moved downward. That is, in FIG. 9A, a right end portion of the eaves portion 56 is positioned more rightward than a right end portion of the recessed portion 52, and a left end portion of the eaves portion 56 is positioned more leftward than a left end portion of the recessed portion 52.

As shown in FIG. 9A, since the eaves portion 56 crosses the virtual region X, the eaves portion 56 can block the foam raw material H that is about to move upward from below to directly enter the recessed portion 52 through the virtual region X during the foam molding in a case where the eaves portion 56 is not provided. The foam raw material H blocked by the eaves portion 56 is guided in a direction in which the eaves portion 56 projects and is guided in a direction away from the recessed portion 52. As a result, the timing at which the foam raw material H enters the recessed portion 52 can be delayed as compared with the case where the eaves portion 56 is not provided. Since the foam raw material H increases in viscosity and is cured with passage of time, the foam raw material H that enters the recessed portion 52 later than to the surroundings is prevented from entering between the locking portion 54 and the locking piece 30.

In the present embodiment, when viewed from the direction in which the eaves portion 56 projects in FIG. 9A, both end portions 56b of the eaves portion 56 that cross the eaves portion 56 in the left-right direction extend upward while being curved along the edge of the recessed portion 52. The both end portions 56b can prevent the foam raw material H, which is located in a vicinity of the virtual region X, from entering the recessed portion 52 in a low viscosity state, and can more effectively prevent the foam raw material H from entering between the locking portion 54 and the locking piece 30.

In the upper-lower direction as viewed from the direction in which the eaves portion 56 projects in FIG. 9A, the both end portions 56b of the eaves portion 56 that cross the eaves portion 56 in the left-right direction preferably extend to a position higher than an intermediate position between an upper end 54c of the retaining portion 54a and a lower end of the recessed portion 52.

As shown in FIG. 11A, in the present embodiment, the eaves portion 56 projects laterally from an intermediate position between a lower end and an upper end of the base portion 55. Here, the lower end of the base portion 55 is a lower surface of the clip holder 50 that is in contact with the lower mold 42. The upper end of the base portion 55 is the lower end of the recessed portion 52. The intermediate position does not mean only one point equidistant from the lower end and the upper end of the base portion 55. The intermediate position refers to any position in a region extending in the upper-lower direction between the lower end and the upper end of the base portion 55. However, as viewed from the direction shown in FIG. 11A, when a region between the lower end and the upper end of the base portion 55 is divided into three equal regions in the upper-lower direction, it is preferable that the eaves portion 56 projects laterally from a central region.

An inclination angle of the inclined surface 56a of the eave portion 56 can be made steeper than in a case where the eave portion 56 projects laterally from the lower end of the base portion 55. When the inclination angle is steep, the foam raw material H can be more effectively guided in the direction away from the recessed portion 52.

(Modification)

The present invention is not limited to the configuration described above, and may be modified, for example, as follows.

Figure 12:
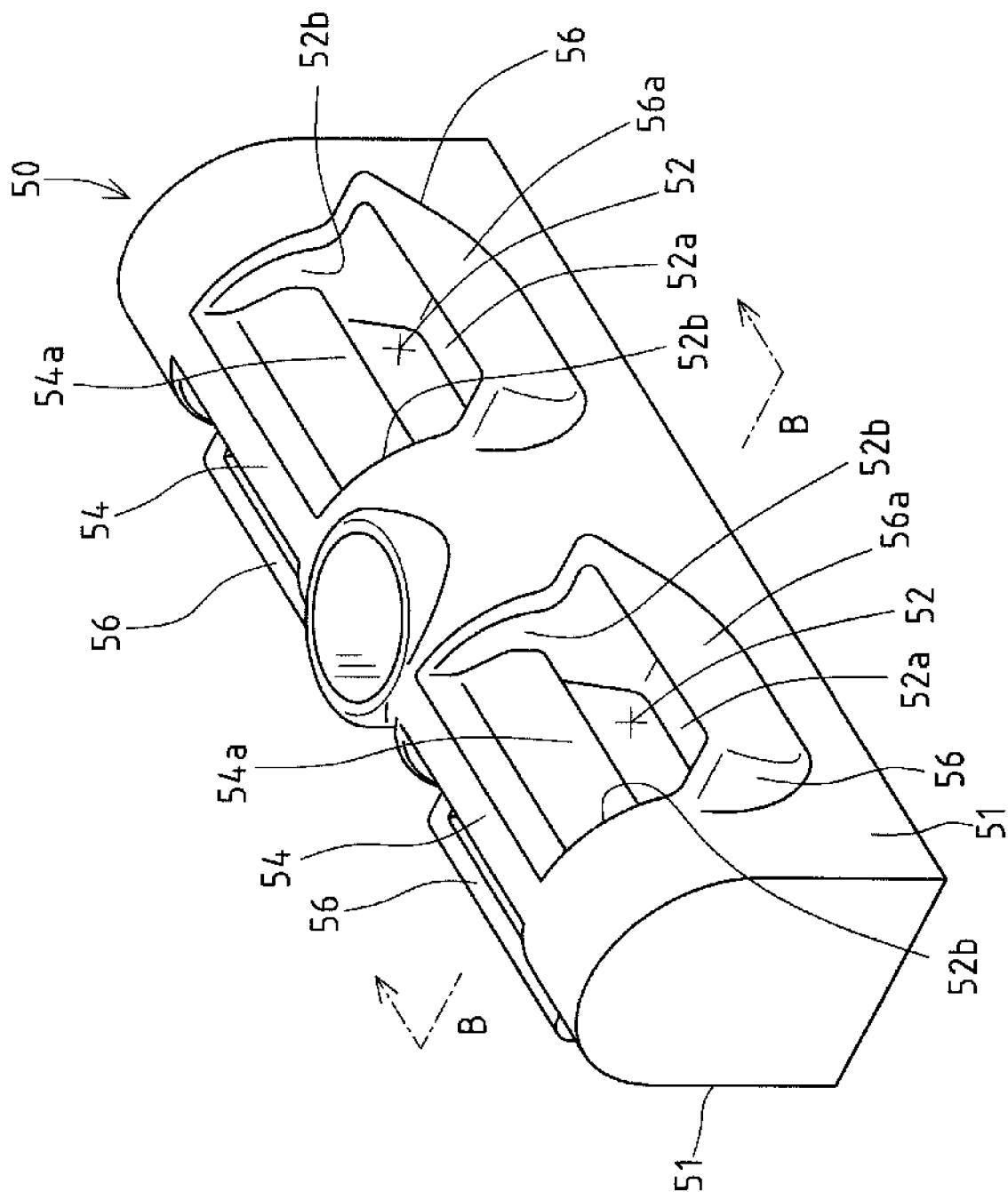
FIG. 12 is a perspective view showing a modification of the clip holder.
Figure 13:
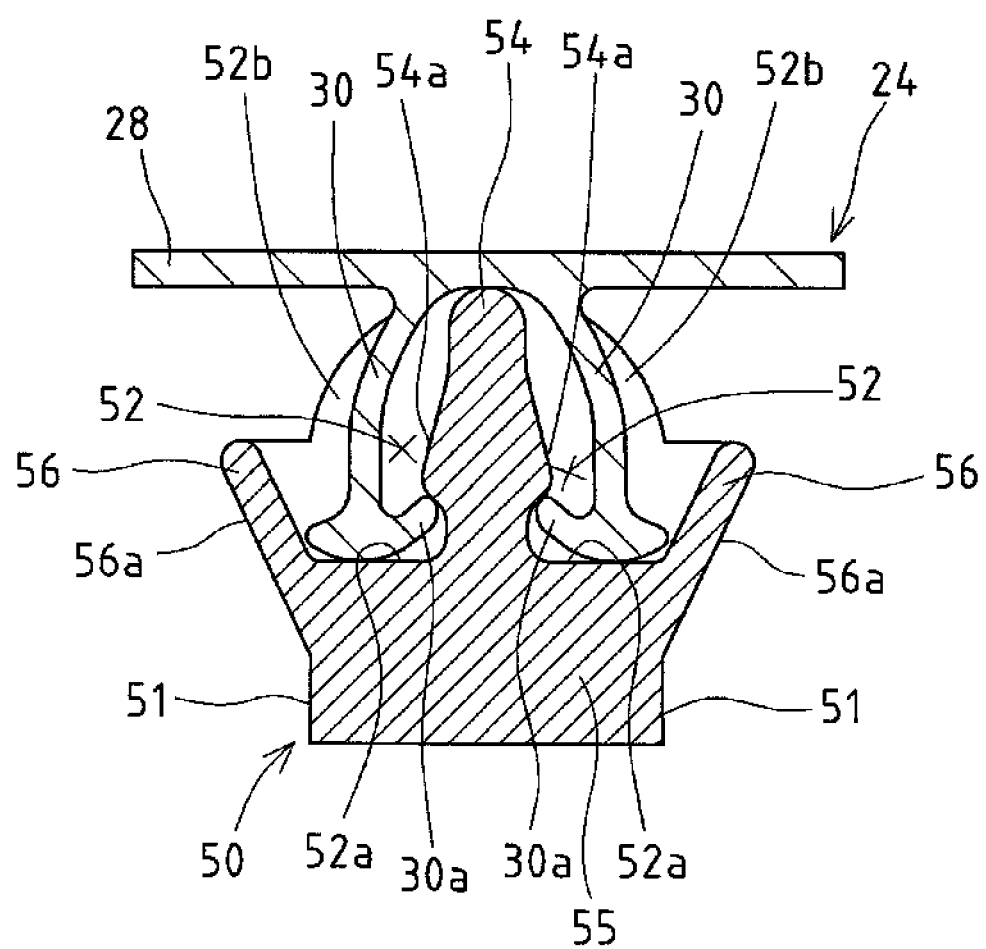
FIG. 13 is a cross-sectional view taken at a position corresponding to a line B-B in FIG. 12.

(1) In the embodiment, the eaves portion is formed according to the open shape of the recessed portion on an outer side in the width direction, and the locking piece, which is fitted to the recessed portion, and the eaves portion do not overlap each other in the width direction, but the present invention is not limited thereto. For example, the eaves portion may be formed to cover at least a part of the outer side in the width direction of the recessed portion, and in this case, the eaves portion is disposed so as to overlap an outer side in the width direction of the locking piece fitted in the recessed portion. Specifically, as shown in FIGS. 12 and 13, the eaves portion 56 is formed so as to extend upward from the lower edge 52a of the recessed portion 52, and the recessed portion 52 is closed by the eaves portion 56 up to an intermediate position of the side edge 52b of the recessed portion 52. By configuring the eaves portion 56 in this way, an upper portion of the eaves portion 56 overlaps the locking piece 30 fitted in the recessed portion 52, and it can be difficult for the foam raw material H to enter between the locking piece 30 and the lower edge 52a of the recessed portion 52 and between the locking piece 30 and a lower portion of the side edge 52b of the recessed portion 52. The eaves portion 56 may be formed to cover the recessed portion 52 up to an upper portion of the side edge 52b of the recessed portion 52 as long as the eaves portion 56 has a shape that does not interfere with the fitting of the locking piece 30 into the recessed portion 52.

(2) In the embodiment, the clip holding unit is formed separately from the projection mold portion of the lower mold, but the present invention is not limited thereto, and the clip holding unit may be formed integrally with the projection mold portion.

(3) Materials of the clip and the clip holding unit are not limited to the embodiment. For example, the clip may be made of metal.

The present application is based on the Japanese patent application (Japanese Patent Application No. 2019-008427) filed on Jan. 22, 2019, and the contents thereof are incorporated herein as reference.

INDUSTRIAL APPLICABILITY

According to the clip holding unit and the molding mold of the present invention, the clip can be easily attached and detached, and the foam can be prevented from adhering to an unnecessary portion.

According to the method for manufacturing a seat pad of the present invention, the clip can be easily attached and detached, and the foam can be prevented from adhering to an unnecessary portion.

REFERENCE SIGNS LIST

10: seat
12: seat portion
14: backrest portion
16: headrest
18: seat cover
20: seat pad
22: groove portion
24: clip
26: attachment tool
28: base portion
28a: through hole
30: locking piece
30a: claw portion
40: molding mold
42: lower mold
42a: lower mold surface
44: upper mold
46: cavity
48: projection mold portion (groove forming portion)
48a: installation recess portion
50: clip holder (clip holding unit)
51: side wall surface
52: recessed portion
52a: lower edge
52b: side edge
54: locking portion
54a: retaining portion
55: base portion
56: eaves portion
56a: inclined surface
56b: end portion
X: virtual region
H: foam raw material

The invention claimed is:

1. A clip holding unit to be used during a foam molding of a seat pad, the seat pad including a clip used for attaching a seat cover to the seat pad, the clip holding unit being provided in a lower mold of a molding mold and holding the clip during the foam molding, the clip holding unit comprising:
a locking portion to be sandwiched between a pair of locking pieces of the clip;
a base portion extending from the lower mold to the locking portion; and
an eaves portion projecting laterally from the base portion, the eaves portion projecting further in a lateral direction as it progresses upward from the base portion, covering a front end of the locking piece,
wherein a height of the locking portion from an upper surface of the base portion is higher than a height of the eaves portion from the upper surface of the base portion,
wherein the locking portion includes a recessed portion that is configured to receive the locking piece and is recessed laterally, and includes a retaining portion that retains the locking piece and bulges laterally, and a height of the recessed portion from the upper surface of the base portion is lower than a height of the eaves portion from the upper surface of the base portion, and wherein heights from the upper surface of the base portion are in the order of the locking portion>the eaves portion>the recessed portion.

2. The clip holding unit according to claim 1, wherein the eaves portion is provided so as to cross, in a left-right direction, a virtual region through which the recessed portion passes when the recessed portion is virtually moved downward, when viewed from a direction in which the eaves portion projects.

3. The clip holding unit according to claim 2, wherein when viewed from the direction in which the eaves portion projects, both end portions of the eaves portion that cross the eaves portion in the left-right direction extend upward while being curved along an edge of the recessed portion.

4. The clip holding unit according to claim 1, wherein the eaves portion projects laterally from an intermediate position between a lower end and an upper end of the base portion.

5. The clip holding unit according to claim 1, wherein the eaves portion projecting in the lateral direction than the locking piece as it progresses upward from the base portion.

6. The clip holding unit according to claim 1, wherein the eaves portion projecting from a side wall surface of the base portion.

7. A clip holding unit to be used during a foam molding of a seat pad, the seat pad including a clip used for attaching a seat cover to the seat pad, the clip holding unit being provided in a lower mold of a molding mold and holding the clip during the foam molding, the clip holding unit comprising:

a locking portion to be sandwiched between a pair of locking pieces of the clip;

a base portion extending from the lower mold to the locking portion; and an eaves portion projecting in a lateral direction from the base portion, having an inclined surface by further projecting in the direction as it progresses upward from the base portion, wherein a height of the locking portion from an upper surface of the base portion is higher than a height of the eaves portion from the upper surface of the base portion, wherein the locking portion includes a recessed portion that is capable of receiving the locking piece and is recessed laterally, and a retaining portion that retains the locking piece and bulges laterally, and a height of the recessed portion from the upper surface of the base portion is lower than a height of the eaves portion from the upper surface of the base portion, wherein the inclined surface comes into contact with a foam material during the foam molding, and wherein heights from the upper surface of the base portion are in the order of the locking portion>the eaves portion>the recessed portion.

\* \* \* \* \*